(12) United States Patent
Heo et al.

(10) Patent No.: US 12,031,729 B2
(45) Date of Patent: Jul. 9, 2024

(54) APPARATUS AND METHOD FOR SUPPLYING HOT WATER

(71) Applicant: KYUNGDONG NAVIEN CO., LTD., Gyeonggi-do (KR)

(72) Inventors: Chang Heoi Heo, Seoul (KR); Yong Min Song, Seoul (KR)

(73) Assignee: Kyungdong Navien Co., Ltd., Gyeonggi-do (KR)

(*) Notice: Subject to any disclaimer, the term of this patent is extended or adjusted under 35 U.S.C. 154(b) by 460 days.

(21) Appl. No.: 17/414,561

(22) PCT Filed: Nov. 7, 2019

(86) PCT No.: PCT/KR2019/015099
§ 371 (c)(1),
(2) Date: Jun. 16, 2021

(87) PCT Pub. No.: WO2020/141712
PCT Pub. Date: Jul. 9, 2020

(65) Prior Publication Data
US 2022/0010976 A1    Jan. 13, 2022

(30) Foreign Application Priority Data

Dec. 31, 2018  (KR) .................. 10-2018-0173563
Dec. 31, 2018  (KR) .................. 10-2018-0173564

(51) Int. Cl.
*F24H 15/36*   (2022.01)
*F24D 19/10*   (2006.01)
(Continued)

(52) U.S. Cl.
CPC ......... *F24D 19/1006* (2013.01); *F24D 19/10* (2013.01); *F24H 9/20* (2013.01);
(Continued)

(58) Field of Classification Search
CPC .... F24D 19/1006; F24D 19/10; F24H 15/215; F24H 15/174; F24H 15/315; F24H 15/219; F24H 15/36
See application file for complete search history.

(56) References Cited

U.S. PATENT DOCUMENTS

| 8,117,998 | B2 | 2/2012 | Kim et al. |
| 9,004,017 | B2* | 4/2015 | Narita ............... F24H 15/45 366/279 |
| 9,228,759 | B2* | 1/2016 | Ando ............... F24H 9/2035 |
| 9,921,012 | B2* | 3/2018 | Fujimoto ............ F24H 15/429 |
| 10,859,276 | B2* | 12/2020 | Braier .............. F24D 17/0057 |
| 10,914,475 | B2* | 2/2021 | Gagne ............... F24D 19/1069 |
| 11,639,813 | B2* | 5/2023 | Hasegawa ............ E03C 1/044 392/308 |

(Continued)

FOREIGN PATENT DOCUMENTS

| CN | 101711330 A | 5/2010 |
| CN | 107144019 A | 9/2017 |

(Continued)

*Primary Examiner* — Gregory A Wilson

(57) ABSTRACT

The apparatus for supplying hot water comprises: at least one processor; a heat exchanger connected to the at least one processor, and configured to receive tap water through a tap water inflow pipe, heat the supplied tap water by means of heat exchange to thereby generate hot water, and discharge the generated hot water through a hot water supply pipe; a burner configured to directly or indirectly provide heat required to generate the hot water; a mixing valve connected to the at least one processor and installed on a mixing pipe connecting the tap water inflow pipe and the hot water supply pipe, and configured to mix the tap water with the hot water discharged from the heat exchanger and flowing through the hot water supply pipe; and a memory connected to the at least one processor and configured to store instructions.

15 Claims, 2 Drawing Sheets

(51) Int. Cl.
*F24H 9/20* (2022.01)
*F24H 15/128* (2022.01)
*F24H 15/174* (2022.01)
*F24H 15/215* (2022.01)
*F24H 15/219* (2022.01)
*F24H 15/315* (2022.01)
*F24H 15/414* (2022.01)
*G05D 23/19* (2006.01)
*F24H 15/238* (2022.01)
*F24H 15/281* (2022.01)

(52) U.S. Cl.
CPC ......... *F24H 9/2007* (2013.01); *F24H 15/128* (2022.01); *F24H 15/174* (2022.01); *F24H 15/215* (2022.01); *F24H 15/219* (2022.01); *F24H 15/315* (2022.01); *F24H 15/36* (2022.01); *F24H 15/414* (2022.01); *G05D 23/1931* (2013.01); *F24H 15/238* (2022.01); *F24H 15/281* (2022.01)

(56) References Cited

U.S. PATENT DOCUMENTS

| | | |
|---|---|---|
| 2010/0212604 A1 | 8/2010 | Kim et al. |
| 2014/0202680 A1* | 7/2014 | Kusachi ................ F24H 15/238 165/287 |
| 2017/0363301 A1 | 12/2017 | Son et al. |
| 2022/0010976 A1* | 1/2022 | Heo ......................... F24H 9/20 |
| 2022/0307726 A1* | 9/2022 | Takahashi ............. F24H 15/174 |

FOREIGN PATENT DOCUMENTS

| | | | |
|---|---|---|---|
| JP | 06288640 A | * | 10/1994 |
| JP | H06-288640 A | | 10/1994 |
| JP | H08-14660 A | | 1/1996 |
| JP | H08-240342 A | | 9/1996 |
| JP | H10-89770 A | | 4/1998 |
| JP | 2001248911 A | * | 9/2001 |
| JP | 2007-078231 A | | 3/2007 |
| KR | 10-2001-0087158 A | | 9/2001 |
| KR | 10-2004-0106653 A | | 12/2004 |
| KR | 10-1620814 B1 | | 5/2016 |

* cited by examiner

US 12,031,729 B2

APPARATUS AND METHOD FOR SUPPLYING HOT WATER

CROSS REFERENCE TO RELATED APPLICATIONS

This application is a national phase nonprovisional patent application of PCT/KR2019/015099 filed on Nov. 7, 2019, which is incorporated by reference herein.

TECHNICAL FIELD

The present disclosure relates to an apparatus and method for supplying hot water, and more particularly, relates to a hot-water supply apparatus and method for efficiently controlling a mixing valve.

BACKGROUND ART

This application claims the benefit of priority to Korean Patent Application Nos. 10-2018-0173563 and 10-2018-0173564, filed in the Korean Intellectual Property Office on Dec. 31, 2018, the entire contents of which are incorporated herein by reference.

A hot-water supply apparatus is an apparatus that heats direct water and supplies hot water at a temperature set by a user, and it is important that the hot-water supply apparatus supplies hot water within a short period of time and always supplies hot water at constant temperature without a temperature deviation when the hot water is used. For this reason, a hot-water supply apparatus using a mixing valve for supply of hot water at constant temperature is widely used.

There are two types of mixing valves: a mechanically controlled mixing valve and an electronically controlled mixing valve. In the case of the mechanically controlled mixing valve, a mixing ratio is mechanically controlled to adjust temperature. The mechanically controlled mixing valve may cause a temperature deviation and does not operate in conjunction with a hot-water supply device. Therefore, there is inconvenience when hot-water set temperature is changed.

In contrast, in the case of the electronically controlled mixing valve, a mixing ratio is electronically controlled to adjust temperature. The electronically controlled mixing valve may automatically control the mixing ratio depending on usage and installation conditions and is generally contained inside a hot-water supply apparatus. For this reason, the hot-water supply apparatus containing the electronically controlled mixing valve is widely used.

To respond to a temperature deviation of the hot-water supply apparatus, the electronically controlled mixing valve has to maintain temperature before mixing by the mixing valve above a hot-water set temperature. This is because hot-water temperature is able to be maintained in response to a phenomenon in which the hot-water temperature is lowered when hot water is reused after used or when a flow rate is increased while the hot water is used. In generally, a method of controlling the amount of heat of a burner after fixing the temperature before mixing in consideration of the hot-water set temperature and in response, varying the mixing ratio of the mixing valve is used.

When the temperature before mixing is excessively higher than the hot-water set temperature, the mixing ratio has to be maintained high. In this case, when a flow rate is decreased while hot water is used or when the flow rate is reused after the hot water is used, proportional control has to be performed for a temperature increment by further increasing the mixing ratio of the mixing valve. However, due to mechanical characteristics of the mixing valve, the mixing ratio may not be able to be controlled to be higher.

Furthermore, even though the maximum mixing ratio of the mixing valve is maintained depending on a usage condition, the temperature before mixing may not be able to be adjusted to a target temperature by calculation. Even in this case, when a flow rate is decreased while hot water is used or when the flow rate is reused after the hot water is used, proportional control has to be performed for a temperature increment by further increasing the mixing ratio of the mixing valve. However, due to the mechanical characteristics of the mixing valve, the mixing valve may not be able to be controlled.

Meanwhile, when a mixing valve is faulty in an electronically controlled hot-water supply apparatus, the mixing valve cannot be normally controlled. Therefore, when the amount of heat of a burner is controlled based on temperature before mixing, the temperature of hot water set by a user may not be met.

Accordingly, a method for efficiently controlling a mixing valve in a hot-water supply apparatus including the electronically controlled mixing valve is required.

DISCLOSURE

Technical Problem

The present disclosure has been made to solve the above-mentioned problems. An aspect of the present disclosure provides a hot-water supply apparatus and method for minimizing a hot-water temperature deviation by efficiently controlling an electronically controlled mixing valve.

Another aspect of the present disclosure provides a hot-water supply apparatus and method for effectively supplying hot water by preventing unnecessary combustion stop and overheating error when an electronically controlled mixing valve is faulty.

Technical Solution

To achieve the objectives, a hot-water supply apparatus according to the present disclosure includes at least one processor, a burner that is connected to the at least one processor and that directly or indirectly provides heat required for generation of hot water to a heat exchanger that receives direct water through a direct-water inflow pipe, generates the hot water by heating the received direct water by heat exchange, and releases the generated hot water through a hot-water supply pipe, a mixing valve that is connected to the at least one processor and disposed in-line with a mixing pipe connecting the direct-water inflow pipe and the hot-water supply pipe and that mixes the direct water with the hot water flowing through the hot-water supply pipe after released from the heat exchanger, and a memory that is connected to the at least one processor and that stores instructions. The instructions, when executed, cause the processor to obtain a reference temperature based on temperature of the direct water and required temperature of the second hot water and control the burner such that temperature of the first hot water released from the heat exchanger reaches the obtained reference temperature, the reference temperature being the temperature of the first hot water that allows the mixing valve to maintain a preset opening ratio.

A hot-water supply method applied to a hot-water supply apparatus is provided. The hot-water supply apparatus includes a burner that directly or indirectly provides heat required for generation of hot water to a heat exchanger that receives direct water through a direct-water inflow pipe, generates the hot water by heating the received direct water by heat exchange, and releases the generated hot water through a hot-water supply pipe, and a mixing valve that is disposed in-line with a mixing pipe connecting the direct-water inflow pipe and the hot-water supply pipe and that mixes the direct water with the hot water flowing through the hot-water supply pipe after released from the heat exchanger. Hot water upstream of a connection point between the hot-water supply pipe and the mixing pipe is referred to as first hot water, and hot water downstream of the connection point is referred to as second hot water. The hot-water supply method includes obtaining a reference temperature based on temperature of the direct water and required temperature of the second hot water, the reference temperature being temperature of the first hot water that allows the mixing valve to maintain a preset opening ratio and controlling the burner such that the temperature of the first hot water released from the heat exchanger reaches the obtained reference temperature.

A hot-water supply apparatus according to the present disclosure includes at least one processor, a burner that is connected to the at least one processor and that directly or indirectly provides heat required for generation of hot water to a heat exchanger that receives direct water through a direct-water inflow pipe, generates the hot water by heating the received direct water by heat exchange, and releases the generated hot water through a hot-water supply pipe, a mixing valve that is connected to the at least one processor and disposed in-line with a mixing pipe connecting the direct-water inflow pipe and the hot-water supply pipe and that mixes the direct water with the hot water flowing through the hot-water supply pipe after released from the heat exchanger, and a memory that is connected to the at least one processor and that stores instructions. Hot water upstream of a connection point between the hot-water supply pipe and the mixing pipe is referred to as first hot water, and hot water downstream of the connection point is referred to as second hot water. The instructions, when executed, cause the processor to determine whether the mixing valve is faulty and control the burner such that temperature of the second hot water supplied to the outside through the hot-water supply pipe reaches a target temperature, when the mixing valve is faulty.

A hot-water supply method applied to a hot-water supply apparatus is provided. The hot-water supply apparatus includes a burner that directly or indirectly provides heat required for generation of hot water to a heat exchanger that receives direct water through a direct-water inflow pipe, generates the hot water by heating the received direct water by heat exchange, and releases the generated hot water through a hot-water supply pipe, and a mixing valve that is disposed in-line with a mixing pipe connecting the direct-water inflow pipe and the hot-water supply pipe and that mixes the direct water with the hot water flowing through the hot-water supply pipe after released from the heat exchanger. Hot water upstream of a connection point between the hot-water supply pipe and the mixing pipe is referred to as first hot water, and hot water downstream of the connection point is referred to as second hot water. The hot-water supply method includes determining whether the mixing valve is faulty and controlling the burner such that temperature of the second hot water supplied to the outside through the hot-water supply pipe reaches a target temperature, when the mixing valve is faulty.

Advantageous Effects

The hot-water supply apparatus and method according to the present disclosure may efficiently control the electronically controlled mixing valve, thereby minimizing a hot-water temperature deviation.

In addition, the hot-water supply apparatus and method according to the present disclosure may prevent unnecessary combustion stop and overheating error when the electronically controlled mixing valve is faulty, thereby effectively supplying hot water.

MODE FOR INVENTION

Hereinafter, embodiments of the present disclosure will be described in detail with reference to the accompanying drawings.

The following embodiments are embodiments appropriate for the understanding of technical features of a hot-water supply apparatus and method according to the present disclosure. However, the present disclosure is not restrictively applied to the embodiments to be described below, and technical features of the present disclosure are not limited by the embodiments to be described. Furthermore, various changes and modifications can be made without departing from the spirit and scope of the present disclosure.

First Embodiment

Figure 1:
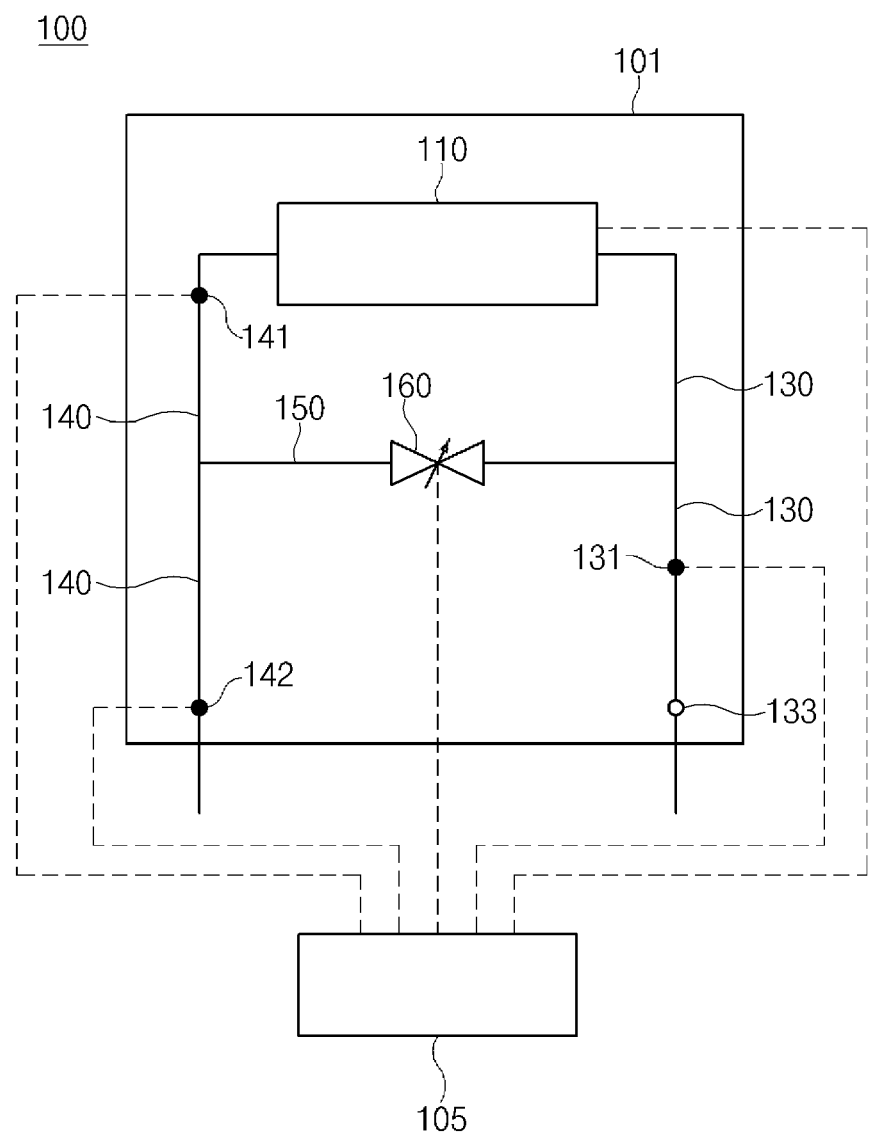
FIG. 1 is a view illustrating one embodiment to which a hot-water supply apparatus according to the present disclosure is applied.

Referring to FIG. 1, a hot-water supply apparatus 100 according to a first embodiment of the present disclosure includes at least one processor 105, a burner (not illustrated), a mixing valve 160, and a memory (not illustrated).

The processor 105 may include one or more of a central processing unit (CPU), an application processor (AP), or a communication processor (CP). The processor 105 may perform, for example, operations or data processing associated with control and/or communication of at least one other component of the hot-water supply apparatus 100. For example, the processor 105 may detect temperatures and flow rates through various sensors included in the hot-water supply apparatus 100 and may control the burner and the mixing valve 160 based on the detected temperatures and flow rates.

The memory is connected to the at least one processor 105 and stores instructions. Here, the memory may include a volatile memory and/or a non-volatile memory. The memory may store commands or data associated with at least one component of the hot-water supply apparatus 100.

The memory may store instructions for control of the processor 105. Hereinafter, operations performed by the processor 105 may be performed through execution of the instructions stored in the memory.

The burner is connected to the at least one processor 105 and directly or indirectly provides heat required for generation of hot water to a heat exchanger 110 that receives direct water through a direct-water inflow pipe 130, generates the hot water by heating the received direct water by heat exchange, and releases the generated hot water through a hot-water supply pipe 140.

Specifically, the heat exchanger 110 may receive the direct water through the direct-water inflow pipe 130, may generate the hot water by heating the received direct water by heat exchange, and may release the generated hot water through the hot-water supply pipe 140. That is, the heat exchanger 110 may heat the direct water by heat exchange and may receive heat required for the heat exchange from the burner.

The burner may directly or indirectly provide heat required for the generation of the hot water in the heat exchanger 110. That is, the burner may directly provide heat to the heat exchanger 110 (refer to FIG. 1), or may indirectly provide heat by introducing heating water, which is heated by heat of the burner, into the heat exchanger 110 (refer to FIG. 2).

The mixing valve 160 is connected to the at least one processor 105 and disposed in-line with a mixing pipe 150 connecting the direct-water inflow pipe 130 and the hot-water supply pipe 140 and mixes the direct water with the hot water that is released from the heat exchanger 110 and that flows through the hot-water supply pipe 140.

Specifically, the mixing pipe 150 may be connected between the direct-water inflow pipe 130 and the hot-water supply pipe 140, and the mixing valve 160 may be disposed in-line with the mixing pipe 150 and may adjust the amount of the direct water supplied to the hot-water supply pipe 140 through the mixing pipe 150 depending on an opening ratio. Here, the direct-water inflow pipe 130 may be provided with a direct-water temperature sensor 131 that measures the temperature of the direct water introduced and a flow rate sensor 133 that measures the flow rate of the direct water introduced.

Hot water upstream of a connection point between the hot-water supply pipe 140 and the mixing pipe 150 may be referred to as first hot water, and hot water downstream of the connection point may be referred to as second hot water.

Specifically, the first hot water is hot water immediately after heat-exchanged in the heat exchanger 110 and is hot water before mixed with the direct water introduced through the mixing pipe 150. The second hot water is hot water generated in the heat exchanger 110 and is hot water mixed with the direct water introduced through the mixing pipe 150. The second hot water may be supplied outside a boiler body 101 through the hot-water supply pipe 140 and may be supplied to a user. Accordingly, the temperature of the second hot water may be set to a required temperature that is a temperature set by the user.

Here, the hot-water supply pipe 140 may be provided with a first hot-water temperature sensor 141 and a second hot-water temperature sensor 142. The first hot-water temperature sensor 141 may be provided upstream of the connection point between the hot-water supply pipe 140 and the mixing pipe 150 and may measure the temperature of the first hot water that is hot-water immediately after heat-exchanged in the heat exchanger 110. The second hot-water temperature sensor 142 may be provided on the hot-water supply pipe 140 downstream of the connection point between the hot-water supply pipe 140 and the mixing pipe 150 and may measure the temperature of the second hot water released.

The instructions stored in the memory, when executed, may cause the processor 105 to obtain a reference temperature based on the temperature of the direct water and the required temperature of the second hot water, the reference temperature being the temperature of the first hot water that allows the mixing valve 160 to maintain a preset opening ratio.

Further, the instructions, when executed, may cause the processor 105 to control the burner such that the temperature of the first hot water released from the heat exchanger 110 reaches the obtained reference temperature.

Specifically, when the amount of heat of the burner is controlled, with the temperature of the first hot water fixed as in the related art, the opening ratio varies depending on the required temperature of the second hot water and the temperature of the direct water.

Table 1 below shows the opening ratio of the mixing valve 160 depending on the temperature of the direct water and the required temperature when the amount of heat is controlled with the temperature of the first hot water fixed.

TABLE 1

| Required Temperature (° C.) | First Hot-Water Temperature (° C.) | Direct-Water Temperature (° C.) | Opening ratio (%) |
|---|---|---|---|
| 40 | 65 | 15 | 50 |
| 40 | 65 | 20 | 56 |
| 40 | 65 | 25 | 63 |
| 50 | 65 | 15 | 30 |
| 50 | 65 | 20 | 33 |
| 50 | 65 | 25 | 38 |
| 60 | 65 | 15 | 10 |
| 60 | 65 | 20 | 11 |
| 60 | 65 | 25 | 13 |

As shown in Table 1, the opening ratio of the mixing valve 160 varies depending on the required temperature and the temperature of the direct water when the temperature of the first hot water is fixed. For example, from the following equation, the opening ratio of the mixing valve 160 is 50% under the condition where the required temperature is 40° C., the temperature of the first hot water is 65° C., and the temperature of the direct water is 15° C. (Opening Ratio= (1−(Required Temperature−Temperature of Direct Water)/ (Reference Temperature−Temperature of Direct Water)) *100)

In a case where the opening ratio is too high in a state in which the maximum opening ratio of the mixing valve 160 is limited, if the temperature of the first hot water is raised when the flow rate is decreased and the hot water is reused, the temperature of the hot water may not be adapted to the required temperature due to the limitation in the maximum opening ratio of the mixing valve 160, and therefore the second hot water having a temperature higher than the required temperature may be supplied.

In contrast, in a case where the opening ratio is too low in a state in which the minimum opening ratio of the mixing valve 160 is limited, if the temperature of the first hot water is lowered when the flow rate is increased and the hot water is reused, the temperature of the hot water may not be adapted to the required temperature due to the limitation in the minimum opening ratio of the mixing valve 160, and therefore the second hot water having a temperature lower than the required temperature may be supplied.

To solve these problems, the present disclosure may obtain the reference temperature by variably applying the temperature of the first hot water, which is hot water immediately after heat-exchanged in the heat exchanger 110, and may control the amount of heat to meet the reference temperature.

Specifically, the instructions stored in the memory cause the processor 105 to obtain the reference temperature based on the temperature of the direct water and the required temperature of the second hot water, the reference temperature being the temperature of the first hot water that allows the mixing valve 160 to maintain the preset opening ratio. Further, the instructions cause the processor 105 to control the burner such that the temperature of the first hot water released from the heat exchanger 110 reaches the obtained reference temperature.

Here, the opening ratio of the mixing valve 160 for acquisition of the reference temperature may be an intermediate value between the maximum opening ratio and the minimum opening ratio of the mixing valve 160. The reference temperature may be obtained by substituting the opening ratio of the mixing valve, the required temperature, and the temperature of the direct water into the following equation.

(Opening Ratio=(1−(Required Temperature−Temperature of Direct Water)/(Reference Temperature−Temperature of Direct Water))*100)

Meanwhile, the instructions, when executed, may cause the processor 105 to obtain a reference opening ratio of the mixing valve, which allows the temperature of the second hot water to reach the required temperature, based on the temperature of the direct water and the temperature of the first hot water measured by the first hot-water temperature sensor and to control the mixing valve depending on the reference opening ratio. That is, the reference opening ratio of the mixing valve may be changed as the temperature of the first hot water is changed, and the reference opening ratio may remain at a predetermined value in a state in which the temperature of the first hot water is stabilized to the level of the reference temperature. Here, the reference opening ratio may be changed by the above-described opening ratio equation.

Table 2, Table 3, and Table 4 below show the opening ratio of the mixing valve 160 depending on the temperature of the direct water and the required temperature when the reference temperature is varied to maintain the opening ratio of the mixing valve 160 at the intermediate value in consideration of a hot-water temperature deviation. Specifically, Table 2 shows the reference temperature depending on the temperature of the direct water under the condition where the required temperature is 40° C. and the opening ratio is 25%, Table 3 shows the reference temperature depending on the temperature of the direct water under the condition where the required temperature is 50° C. and the opening ratio is 25%, and Table 4 shows the reference temperature depending on the temperature of the direct water under the condition where the required temperature is 60° C. and the opening ratio is 25%.

TABLE 2

| Test Example | Required Temperature (° C.) | Reference Temperature (° C.) | Direct-Water Temperature (° C.) | Opening ratio (%) |
|---|---|---|---|---|
| 2-1 | 40 | 50 | 10 | 25 |
| 2-2 | 40 | 48.5 | 15 | 25 |
| 2-3 | 40 | 46.5 | 20 | 25 |
| 2-4 | 40 | 45 | 25 | 25 |
| 2-5 | 40 | 43.4 | 30 | 25 |
| 2-6 | 40 | 45 | 30 | 33 |

TABLE 3

| Test Example | Required Temperature (° C.) | Reference Temperature (° C.) | Direct-Water Temperature (° C.) | Opening ratio (%) |
|---|---|---|---|---|
| 3-1 | 50 | 63 | 10 | 25 |
| 3-2 | 50 | 61.5 | 15 | 25 |
| 3-3 | 50 | 60 | 20 | 25 |
| 3-4 | 50 | 58.5 | 25 | 25 |
| 3-5 | 50 | 56.5 | 30 | 25 |

TABLE 4

| Test Example | Required Temperature (° C.) | Reference Temperature (° C.) | Direct-Water Temperature (° C.) | Opening ratio (%) |
|---|---|---|---|---|
| 4-1 | 60 | 77 | 10 | 25 |
| 4-2 | 60 | 75 | 15 | 25 |
| 4-3 | 60 | 73 | 20 | 25 |
| 4-4 | 60 | 71.5 | 25 | 25 |
| 4-5 | 60 | 70 | 30 | 25 |
| 4-6 | 60 | 75 | 10 | 23 |

When the amount of heat of the burner is controlled by variably applying the reference temperature as described above, the second hot water may be supplied according to the required temperature while the hot-water temperature deviation is minimized even in a changed situation in which the flow rate is changed or the hot water is reused. However, when the varied reference temperature is too high or low, the temperature of the second hot water may not be adapted to the required temperature or combustion stop and overheating error may occur. To solve these problems, the reference temperature may be adjusted.

That is, the instructions, when executed, may cause the processor 105 to adjust the reference temperature to a first adjustment temperature such that the obtained reference temperature is within a first reference range, when the obtained reference temperature is outside the preset first reference range.

Furthermore, the instructions, when executed, may cause the processor 105 to control the burner such that the temperature of the first hot water released from the heat exchanger 110 reaches the adjusted first adjustment temperature.

The instructions, when executed, may cause the processor 105 to obtain the reference opening ratio based on the temperature of the direct water and the adjusted first adjustment temperature, the reference opening ratio being the opening ratio of the mixing valve 160 that allows the temperature of the second hot water to reach the required temperature. In addition, the instructions, when executed, may cause the processor 105 to control the mixing valve 160 depending on the reference opening ratio.

Specifically, when the reference temperature obtained by the above-described opening ratio equation is outside the first reference range, the reference opening ratio may be calculated by the following equation obtained by adjusting the reference temperature in the above-described opening ratio equation to the first adjustment temperature. The following equation may be an equation stored in a system, and the instructions, when executed, may cause the processor 105 to automatically calculate the reference opening ratio.

(Reference Opening Ratio=(1−(Required Temperature−Temperature of Direct Water)/(First Adjustment Temperature−Temperature of Direct Water))*100)

More specifically, the instructions, when executed, may cause the processor 105 to adjust the first adjustment temperature to a minimum value of the first reference range when the reference temperature obtained is below the first reference range and to adjust the first adjustment temperature to a maximum value of the first reference range when the reference temperature obtained is above the first reference range.

For example, the reference temperature has to be about 43.4° C. so as to maintain an opening ratio of 25% under the condition where the required temperature is 40° C. and the temperature of the direct water is 30° C. as in test example 2-5 in Table 2 above. However, because the difference between the required temperature and the reference temperature is about 3.4° C. in this case, the second hot water having a temperature lower than the required temperature may be supplied under the condition of a temperature drop such as a flow-rate increase. Accordingly, to compensate for this problem, the first adjustment temperature to which the reference temperature is adjusted may be set to 45° C. that is the minimum value of the first reference range, and the adjusted reference opening ratio may be 33% (refer to test example 2-6).

In contrast, the reference temperature has to be about 77° C. so as to maintain an opening ratio of 25% under the condition where the required temperature is 60° C. and the temperature of the direct water is 10° C. as in test example 4-1 in Table 4 above. However, because the reference temperature is too high in this case, the temperature of the hot water may be raised when the flow rate is decreased. Therefore, combustion stop and overheating error of the combustion burner may occur. Accordingly, to compensate for this problem, the first adjustment temperature to which the reference temperature is adjusted may be set to 75° C. that is the maximum value of the first reference range, and the adjusted reference opening ratio may be 23% (refer to test example 4-6).

Meanwhile, when the opening ratio of the mixing valve 160 is additionally adjusted in consideration of an operating heat-amount condition of the burner, the hot-water temperature deviation may be further minimized.

Specifically, the instructions, when executed, may cause the processor 105 to adjust the reference temperature to a second adjustment temperature based on the temperature of the direct water, the required temperature of the second hot water, and a predetermined opening ratio lower than the preset opening ratio when the operating ratio of the burner required to reach the obtained reference temperature is above a preset second reference range. In contrast, the instructions, when executed, may cause the processor 105 to adjust the reference temperature to the second adjustment temperature based on the temperature of the direct water, the required temperature of the second hot water, and a predetermined opening ratio higher than the preset opening ratio when the operating ratio of the burner required to reach the obtained reference temperature is below the preset second reference range. Here, the operating ratio of the burner means the ratio (%) of the amount of heat currently provided to the maximum amount of heat that the burner is able to provide.

Furthermore, the instructions, when executed, may cause the processor 105 to control the burner such that the temperature of the first hot water released from the heat exchanger 110 reaches the adjusted second adjustment temperature.

The instructions, when executed, may cause the processor 105 to obtain the second adjustment temperature based on the temperature of the direct water, the required temperature, and the minimum opening ratio of the mixing valve when the operating ratio of the burner required to reach the obtained reference temperature is above the preset second reference range and to obtain the second adjustment temperature based on the temperature of the direct water, the required temperature, and the maximum opening ratio of the mixing valve when the operating ratio of the burner required to reach the obtained reference temperature is below the preset second reference range.

However, the opening ratio of the mixing valve is not limited to the minimum opening ratio and the maximum opening ratio and may be adjusted to be lower or higher than the preset opening ratio of the mixing valve (e.g., the intermediate value between the minimum opening ratio and the maximum opening ratio).

In other words, when the operating ratio of the burner required to reach the obtained reference temperature is high, the opening ratio of the mixing valve may be lowered to a predetermined opening ratio, and the second adjustment temperature may be obtained based on the lowered predetermined opening ratio, the temperature of the direct water, and the required temperature. In contrast, when the operating ratio of the burner is low, the opening ratio of the mixing valve may be raised to a predetermined opening ratio, and the second adjustment temperature may be obtained based on the raised predetermined opening ratio, the temperature of the direct water, and the required temperature.

When the operating ratio of the burner is high, it is efficient to consider a condition by which the operating ratio is decreased (e.g., a condition by which a flow rate is decreased). Therefore, to solve a phenomenon in which temperature is raised when a flow rate is decreased, it is efficient to maintain the opening ratio of the mixing valve low. In contrast, when the operating ratio of the burner is low, it is efficient to consider a condition by which the operating ratio is increased (e.g., a condition by which a flow rate is increased). Therefore, to solve a phenomenon in which temperature is lowered when a flow rate is increased, it is efficient to maintain the opening ratio of the mixing valve high.

For example, when the maximum operating ratio is 100% and the current operating ratio of the burner is 100%, control has to be performed with a focus on a condition by which temperature is raised, and therefore it is efficient to lower the opening ratio. In contrast, when the minimum operating ratio is 10% and the current operating ratio of the burner is 10%, control has to be performed with a focus on a condition by which temperature is lowered, and therefore it is efficient to raise the opening ratio.

Accordingly, the control range of the mixing valve may be sufficiently ensured in a condition by which the operating ratio of the burner is varied, that is, a condition by which a flow rate is increased or decreased.

Table 5, Table 6, and Table 7 below show the predetermined opening ratio of the mixing valve 160 and the second adjustment temperature depending on the operating ratio of the burner.

Table 5 shows the second adjustment temperature and the predetermined opening ratio depending on the operating ratio of the burner under the condition where the required temperature is 40° C. and the temperature of the direct water is 20° C., Table 6 shows the second adjustment temperature and the predetermined opening ratio depending on the operating ratio of the burner under the condition where the required temperature is 50° C. and the temperature of the direct water is 20° C., and Table 7 shows the second adjustment temperature and the predetermined opening ratio depending on the operating ratio of the burner under the condition where the required temperature is 60° C. and the temperature of the direct water is 20° C.

TABLE 5

| Test Example | Operating Ratio (%) | Required Temperature (° C.) | Second Adjustment Temperature (° C.) | Direct-Water Temperature (° C.) | Predetermined Opening ratio (%) |
|---|---|---|---|---|---|
| 5-1 | 80 | 40 | 42.3 | 20 | 10 |
| 5-2 | 65 | 40 | 44 | 20 | 17 |
| 5-3 | 50 | 40 | 46.5 | 20 | 25 |
| 5-4 | 35 | 40 | 49.5 | 20 | 32 |
| 5-5 | 20 | 40 | 53 | 20 | 39 |

TABLE 6

| Test Example | Operating Ratio (%) | Required Temperature (° C.) | Second Adjustment Temperature (° C.) | Direct-Water Temperature (° C.) | Predetermined Opening ratio (%) |
|---|---|---|---|---|---|
| 6-1 | 80 | 50 | 53.5 | 20 | 10 |
| 6-2 | 65 | 50 | 56 | 20 | 17 |
| 6-3 | 50 | 50 | 60 | 20 | 25 |
| 6-4 | 35 | 50 | 64 | 20 | 32 |
| 6-5 | 20 | 50 | 69 | 20 | 39 |
| 6-6 | 20 | 50 | 65 | 20 | 33 |

TABLE 7

| Test Example | Operating Ratio (%) | Required Temperature (° C.) | Second Adjustment Temperature (° C.) | Direct-Water Temperature (° C.) | Predetermined Opening ratio (%) |
|---|---|---|---|---|---|
| 7-1 | 80 | 60 | 64.5 | 20 | 10 |
| 7-2 | 65 | 60 | 65.5 | 20 | 17 |
| 7-3 | 50 | 60 | 73 | 20 | 25 |
| 7-4 | 35 | 60 | 79 | 20 | 32 |
| 7-5 | 20 | 60 | 83.5 | 20 | 39 |
| 7-6 | 35 | 60 | 75 | 20 | 27 |
| 7-7 | 20 | 60 | 75 | 20 | 27 |

When the burner's operating ratio to meet the required temperature is low, the opening ratio of the mixing valve may be raised to a predetermined opening ratio, and the second adjustment temperature obtained by the above-described opening ratio equation may also be raised based on the predetermined opening ratio. Accordingly, when a flow rate is increased, a controllable range of the mixing valve 160 may be sufficiently ensured. In contrast, when the burner's operating ratio to meet the required temperature is high, the opening ratio of the mixing valve may be lowered to a predetermined opening ratio, and the second adjustment temperature obtained by the above-described opening ratio equation may also be lowered based on the predetermined opening ratio. Accordingly, when a flow rate is decreased, a controllable range of the mixing valve 160 may be sufficiently ensured. However, when the adjusted second adjustment temperature is too high or low, combustion stop and overheating error of the burner may occur. Therefore, the second adjustment temperature may be adjusted to a third adjustment temperature.

Specifically, the instructions, when executed, may cause the processor 105 to adjust the second adjustment temperature to the third adjustment temperature within a third reference range when the adjusted second adjustment temperature is outside the preset third reference range. Furthermore, the instructions, when executed, may cause the processor 105 to control the burner such that the temperature of the first hot water released from the heat exchanger 110 reaches the adjusted third adjustment temperature.

For example, the second adjustment temperature is about 83.5° C. under the condition where the required temperature is 60° C., the temperature of the direct water is 20° C., and the operating ratio of the burner is 20% as in test example 7-5 in Table 7. In this case, the second adjustment temperature is too high. Therefore, when a flow rate is decreased, the second adjustment temperature may be excessively raised so that combustion stop and overheating error may occur. Accordingly, to compensate for this problem, the third adjustment temperature to which the second adjustment temperature is adjusted may be set to 75° C. that is the maximum value of the third reference range, and the adjusted reference opening ratio may be 27% (refer to test example 7-7). Likewise, test examples 6-5 and 7-4 may be adjusted to test examples 6-6 and 7-6.

Figure 2:
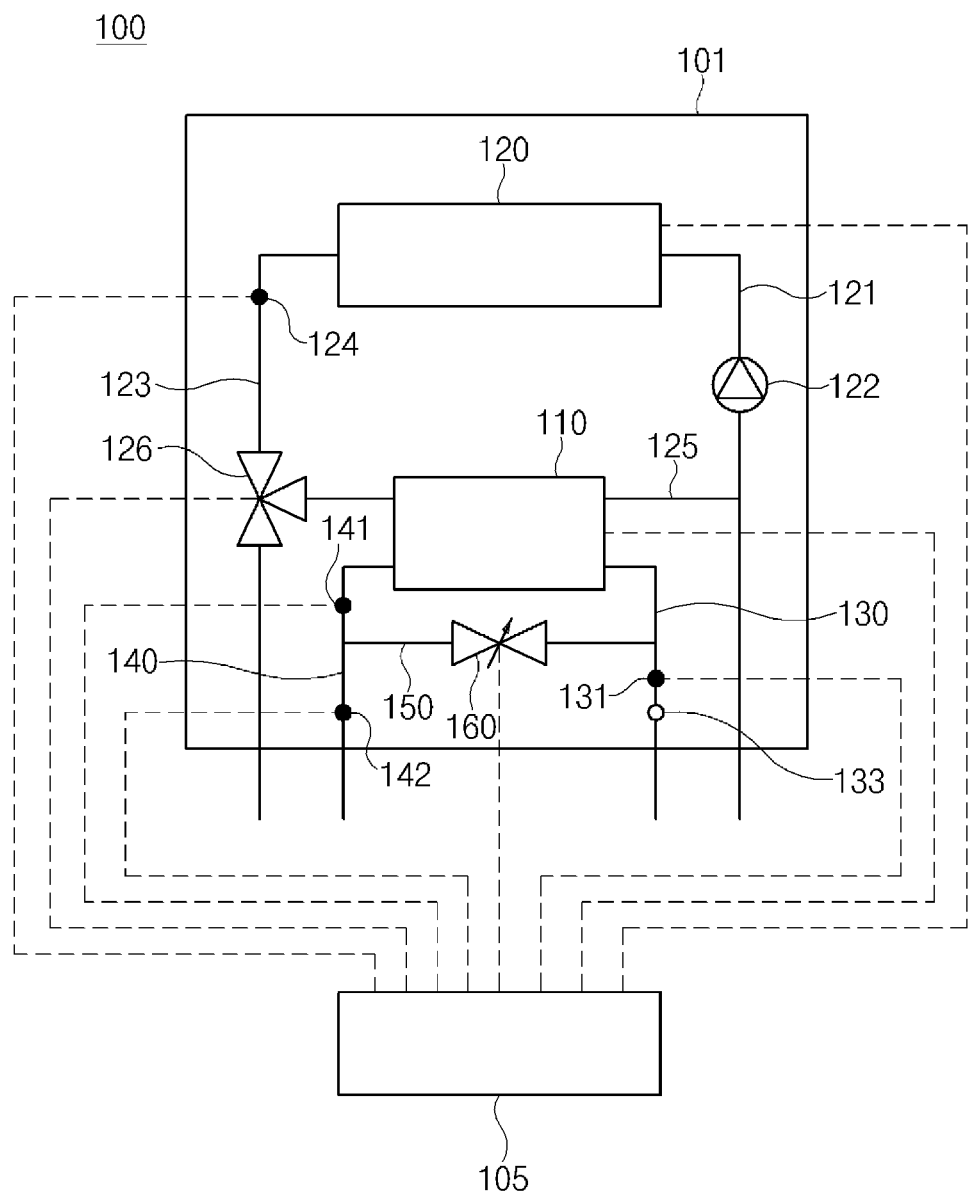
FIG. 2 is a view illustrating another embodiment to which the hot-water supply apparatus according to the present disclosure is applied.

Meanwhile, referring to FIG. 2, the hot-water supply apparatus 100 according to the present disclosure may be applied to, for example, a boiler.

That is, the present disclosure may further include a heating heat exchanger 120 that receives heat from the burner and heats heating water by heat exchange. The heating water heated in the heating heat exchanger 120 may be supplied to the heat exchanger 110, and the heat exchanger 110 may generate the hot water by heating the direct water by heat exchange with the heating water.

Furthermore, the present disclosure may further include a heating-water circulation pipe 121 that circulates the heating water to the heating heat exchanger 120 and a heating-water supply pipe 123 that supplies the heating water heated in the heating heat exchanger 120 to an object to be heated. A circulation pump 122 may be connected to the heating-water circulation pipe 121, and the heating-water supply pipe may be provided with a supply temperature sensor 124.

A connecting pipe 125 may be connected to the heating-water circulation pipe 121 and the heating-water supply pipe 123, and a three-way valve 126 for transition to a heating mode or a hot-water mode may be connected to a connection point between the heating-water supply pipe 123 and the connecting pipe 125. The heat exchanger 110 may be connected to the connecting pipe 125, and in the hot-water mode, the heating water and the direct water may exchange heat with each other. In this way, the heat exchanger 110 may indirectly receive heat that the burner provides to the heating heat exchanger 120.

A hot-water supply method according to another aspect of the first embodiment of the present disclosure will be described. The hot-water supply method, which will be described below, uses the above-described hot-water supply apparatus 100. Therefore, repetitive descriptions identical to ones given above will be omitted.

The hot-water supply method according to the first embodiment of the present disclosure relates to a hot-water supply method applied to the hot-water supply apparatus that includes the burner that is connected to the at least one processor 105 and that directly or indirectly provides heat required for generation of hot water to the heat exchanger 110 that receives direct water through the direct-water inflow pipe 130, generates the hot water by heating the received direct water by heat exchange, and releases the generated hot water through the hot-water supply pipe 140, and the mixing valve 160 that is connected to the at least one processor 105 and disposed in-line with the mixing pipe 150 connecting the direct-water inflow pipe 130 and the hot-water supply pipe 140 and that mixes the direct water with the hot water that is released from the heat exchanger 110 and that flows through the hot-water supply pipe 140.

The hot water upstream of the connection point between the hot-water supply pipe 140 and the mixing pipe 150 is referred to as the first hot water, and the hot water downstream of the connection point is referred to as the second hot water.

The hot-water supply method according to the present disclosure may include a step of obtaining a reference temperature based on the temperature of the direct water and required temperature of the second hot water, the reference temperature being the temperature of the first hot water that allows the mixing valve 160 to maintain a preset opening ratio and a step of controlling the burner such that the temperature of the first hot water released from the heat exchanger 110 reaches the obtained reference temperature.

The above-described hot-water supply apparatus 100 and method according to the first embodiment of the present disclosure may be applied to a second embodiment of the present disclosure that will be described below.

Second Embodiment

Hereinafter, a hot-water supply apparatus 100 and method according to the second embodiment of the present disclosure will be described. It is based on control in case of a failure in a mixing valve 160 of the hot-water supply apparatus 100 according to the second embodiment of the present disclosure.

Referring to FIG. 1, the hot-water supply apparatus 100 according to the second embodiment of the present disclosure includes at least one processor 105, a burner (not illustrated), the mixing valve 160, and a memory (not illustrated).

The processor 105 may include one or more of a central processing unit (CPU), an application processor (AP), or a communication processor (CP). The processor 105 may perform, for example, operations or data processing associated with control and/or communication of at least one other component of the hot-water supply apparatus 100. For example, the processor 105 may detect temperatures and flow rates through various sensors included in the hot-water supply apparatus 100 and may control the burner and the mixing valve 160 based on the detected temperatures and flow rates.

The memory is connected to the at least one processor 105 and stores instructions. Here, the memory may include a volatile memory and/or a non-volatile memory. The memory may store commands or data associated with at least one component of the hot-water supply apparatus 100.

The memory may store instructions for control of the processor 105. Hereinafter, operations performed by the processor 105 may be performed through execution of the instructions stored in the memory.

The burner is connected to the at least one processor 105 and directly or indirectly provides heat required for generation of hot water to a heat exchanger 110 that receives direct water through a direct-water inflow pipe 130, generates the hot water by heating the received direct water by heat exchange, and releases the generated hot water through a hot-water supply pipe 140.

Specifically, the heat exchanger 110 may receive direct water through the direct-water inflow pipe 130, may generate the hot water by heating the received direct water by heat exchange, and may release the generated hot water through the hot-water supply pipe 140. That is, the heat exchanger 110 may heat the direct water by heat exchange and may receive heat required for the heat exchange from the burner.

The burner may directly or indirectly provide heat required for the generation of the hot water in the heat exchanger 110. That is, the burner may directly provide heat to the heat exchanger 110 (refer to FIG. 1), or may indirectly provide heat by introducing heating water, which is heated by heat of the burner, into the heat exchanger 110 (refer to FIG. 2).

The mixing valve 160 is connected to the at least one processor 105 and disposed in-line with a mixing pipe 150 connecting the direct-water inflow pipe 130 and the hot-water supply pipe 140 and mixes the direct water with the hot water that is released from the heat exchanger 110 and that flows through the hot-water supply pipe 140.

Specifically, the mixing pipe 150 may be connected between the direct-water inflow pipe 130 and the hot-water supply pipe 140, and the mixing valve 160 may be disposed in-line with the mixing pipe 150 and may adjust the amount of the direct water supplied to the hot-water supply pipe 140 through the mixing pipe 150 depending on an opening ratio. Here, the direct-water inflow pipe 130 may be provided with a direct-water temperature sensor 131 that measures the temperature of the direct water introduced and a flow rate sensor 133 that measures the flow rate of the direct water introduced.

Hot water upstream of a connection point between the hot-water supply pipe 140 and the mixing pipe 150 may be referred to as first hot water, and hot water downstream of the connection point may be referred to as second hot water.

Specifically, the first hot water is hot water immediately after heat-exchanged in the heat exchanger 110 and is hot water before mixed with the direct water introduced through the mixing pipe 150. The second hot water is hot water generated in the heat exchanger 110 and is hot water mixed with the direct water introduced through the mixing pipe 150. The second hot water may be supplied outside a boiler body 101 through the hot-water supply pipe 140 and may be supplied to a user.

Here, the temperature of the second hot water set by the user is defined as required temperature, and the temperature to which the burner elevates the second hot water to adapt the second hot water to the required temperature is defined as target temperature. The target temperature may be adjusted depending on situations, may be similar to, for example, the required temperature, and may be adjusted to a temperature lower than the required temperature depending on the reference temperature of the first hot water and residual heat of the burner.

The hot-water supply pipe 140 may be provided with a first hot-water temperature sensor 141 and a second hot-water temperature sensor 142. The first hot-water temperature sensor 141 may be provided upstream of the connection point between the hot-water supply pipe 140 and the mixing pipe 150 and may measure the temperature of the first hot water that is hot-water immediately after heat-exchanged in the heat exchanger 110. The second hot-water temperature sensor 142 may be provided on the hot-water supply pipe 140 downstream of the connection point between the hot-water supply pipe 140 and the mixing pipe 150 and may measure the temperature of the second hot water released.

The instructions stored in the memory, when executed, may cause the processor 105 to determine whether the mixing valve 160 is faulty and control the burner such that the temperature of the second hot water supplied to the outside through the hot-water supply pipe reaches the target temperature, when it is determined that the mixing valve 160 is faulty.

Specifically, when the mixing valve 160 is normal, the hot water may be supplied while a hot-water temperature deviation is minimized, by adjusting the opening ratio of the mixing valve 160 after controlling the amount of heat of the burner based on the hot water before mixing. However, when the mixing valve 160 is faulty, if the amount of heat of the burner is controlled based on the temperature before mixing, it is difficult to adjust the temperature of the hot water by the mixing valve 160, and therefore the temperature of the second hot water released may not be adapted to the required temperature set by the user.

Accordingly, when it is determined that the mixing valve 160 is faulty, the present disclosure may control the amount of heat of the burner based on the temperature of the second hot water rather than the temperature of the first hot water. That is, the instructions, when executed, may cause the processor 105 to control the burner such that the temperature of the second hot water reaches the target temperature.

Meanwhile, in a case where the mixing valve 160 is faulty, the instructions, when executed, may cause the processor 105 to obtain the opening ratio of the mixing valve 160 in the faulty state.

The instructions, when executed, may cause the processor 105 to obtain the reference temperature based on the obtained opening ratio of the mixing valve 160, the temperature of the direct water, and the required temperature, the reference temperature being the temperature of the first hot water. The instructions, when executed, may cause the processor 105 to adjust the reference temperature to a fourth adjustment temperature such that the reference temperature is within a fourth reference range, when the obtained reference temperature is outside the preset fourth reference range.

The instructions, when executed, may cause the processor 105 to obtain the target temperature based on the temperature of the direct water, the obtained opening ratio of the mixing valve 160, and the fourth adjustment temperature. The instructions, when executed, may cause the processor 105 to control the burner such that the temperature of the second hot water reaches the obtained target temperature.

The instructions, when executed, may cause the processor 105 to obtain the opening ratio of the mixing valve 160 in the faulty state, based on the temperature of the direct water and the temperatures of the first hot water and the second hot water in the faulty state. At this time, the temperatures of the first hot water and the second hot water may be measured by the first hot-water temperature sensor 141 and the second hot-water temperature sensor 142.

Specifically, in the present disclosure, overheating error and combustion stop of the burner are determined based on the temperature of the first hot water that is hot water immediately after heat-exchanged in the heat exchanger 110. That is, when the temperature of the first hot water exceeds a predetermined range, overheating error of the burner may occur. The fourth reference range may be a temperature range of the first hot water that is set to prevent combustion stop or overheating error of the burner. The present disclosure may adjust the target temperature of the burner to perform control for preventing the reference temperature of the first hot water from exceeding the fourth reference range.

For example, the instructions, when executed, may cause the processor 105 to set the fourth adjustment temperature to the maximum value of the fourth reference range, when the obtained reference temperature is above the fourth reference range.

Table 8 and Table 9 below show the reference temperature depending on the temperature of the direct water under the condition where the required temperature is 50° C. and the condition where the required temperature is 60° C., when the mixing valve 160 is faulty at an opening ratio of 50%. Here, the reference temperature is the temperature of the first hot water that is obtained in the faulty state, based on the required temperature, the temperature of the direct water, and the opening ratio.

TABLE 8

| Test Example | Required Temperature (° C.) | Reference Temperature (° C.) | Direct-Water Temperature (° C.) | Opening ratio (%) |
| --- | --- | --- | --- | --- |
| 8-1 | 50 | 90 | 10 | 50 |
| 8-2 | 50 | 85.5 | 15 | 50 |
| 8-3 | 50 | 80 | 20 | 50 |
| 8-4 | 50 | 75 | 25 | 50 |
| 8-5 | 50 | 70 | 30 | 50 |

TABLE 9

| Test Example | Required Temperature (° C.) | Reference Temperature (° C.) | Direct-Water Temperature (° C.) | Opening ratio (%) |
| --- | --- | --- | --- | --- |
| 9-1 | 60 | 110 | 10 | 50 |
| 9-2 | 60 | 105 | 15 | 50 |
| 9-3 | 60 | 100 | 20 | 50 |
| 9-4 | 60 | 95 | 25 | 50 |
| 9-5 | 60 | 90 | 30 | 50 |

Referring to Table 8 and Table 9, when the mixing valve 160 is faulty at 50%, the reference temperature is raised as the required temperature is raised and the temperature of the direct water is lowered. When the required temperature is raised depending on the opening ratio of the mixing valve 160 in the faulty state, the reference temperature may be raised, and therefore combustion stop or overheating error may occur. Particularly, when the opening ratio of the mixing valve 160 in the faulty state is high, the reference temperature may be too high based on the required temperature, and therefore combustion stop or overheating error may occur. When the reference temperature in the faulty state is too high or low, the target temperature may be adjusted such that the reference temperature is within an appropriate range.

For example, from the following equation, the reference temperature of the first hot water to meet the required temperature has to be 105° C. under the condition where the required temperature is 60° C., the temperature of the direct water is 15° C., and the opening ratio of the mixing valve 160 in the faulty state is 50%.

(Opening Ratio=(1−(Required Temperature−Temperature of Direct Water)/(Reference Temperature−Temperature of Direct Water))*100)

In this case, the reference temperature may be too high, and therefore combustion stop or overheating error of the burner may occur. Accordingly, the target temperature of the burner needs to be lower than the required temperature. In this case, the present disclosure may make an adjustment such that the reference temperature is within a fourth temperature range (may adjust the reference temperature to the fourth adjustment temperature) and thereafter may calculate/ obtain the target temperature based on the temperature of the direct water, the opening ratio in the faulty state, and the fourth adjustment temperature.

By performing control in this way, combustion stop or overheating error of the burner due to the high reference temperature of the second hot water may be prevented.

Meanwhile, even though the amount of heat of the burner is controlled based on the temperature of the second hot water in a state in which the mixing valve 160 is faulty, the temperature of the hot water may be raised by residual heat according to characteristics of the hot-water supply apparatus 100 when the hot water is reused. That is, because the temperature of the hot water is not able to be adjusted by the mixing valve 160 in the state in which the mixing valve 160 is faulty, the residual heat may affect the temperature of the released hot water as it is. The degree to which the temperature is raised by the residual heat may vary depending on characteristics of a system, such as the type of the burner, the type of the heat exchanger 110, and the like. In general, when combustion is stopped in a state in which the amount of heat of the burner is high, the temperature in the heat exchanger 110 may be further raised by residual heat of the burner and the heat exchanger 110.

To solve this problem, control for preventing supply of the second hot water having too high a temperature may be performed in consideration of an influence of residual heat in the state in which the mixing valve 160 is faulty.

Specifically, the instructions, when executed, may cause the processor 105 to predict the degree to which the temperature of the second hot water is raised by residual heat depending on the operating ratio of the burner, when the mixing valve 160 is faulty. Here, the operating ratio of the burner means the ratio (%) of the amount of heat currently provided to the maximum amount of heat that the burner is able to provide.

Furthermore, the instructions, when executed, may cause the processor 105 to set the target temperature in consideration of the predicted degree to which the temperature of the second hot water is raised and to control the burner such that the temperature of the second hot water reaches the set target temperature.

TABLE 10

| Operating Ratio (%) | Required Temperature (° C.) | Temperature Rise (° C.) by Residual Heat |
|---|---|---|
| 100 | 50 | 25 |
| 80 | 50 | 20 |
| 60 | 50 | 15 |
| 40 | 50 | 10 |
| 20 | 50 | 5 |

For example, as shown in Table 10, under the condition where the required temperature is 50° C. and the operating ratio of the burner is 100%, the temperature of the hot water may be raised to 75° C. by residual heat depending on situations, when the hot water is reused after stopped during combustion. In this case, the second hot water is supplied at high temperature, and therefore there is a risk that the user suffers a burn. Accordingly, to minimize a rise in the temperature of the hot water by residual heat, the required temperature may be lowered to a second set temperature, and heat quantity control of the burner for adjusting the temperature of the second hot water to the second set temperature may be performed.

Thus, the amount of heat of the burner may be lowered, and combustion stop at high heat quantity and a temperature rise by residual heat under the condition where the hot water is reused may be minimized.

Meanwhile, referring to FIG. 2, the hot-water supply apparatus 100 according to the present disclosure may be applied to, for example, a boiler.

That is, the present disclosure may further include a heating heat exchanger 120 that receives heat from the burner and heats heating water by heat exchange. The heating water heated in the heating heat exchanger 120 may be supplied to the heat exchanger 110, and the heat exchanger 110 may generate the hot water by heating the direct water by heat exchange with the heating water.

Furthermore, the present disclosure may further include a heating-water circulation pipe 121 that circulates the heating water to the heating heat exchanger 120 and a heating-water supply pipe 123 that supplies the heating water heated in the heating heat exchanger 120 to an object to be heated. A circulation pump 122 may be connected to the heating-water circulation pipe 121, and the heating-water supply pipe may be provided with a supply temperature sensor 124.

A connecting pipe 125 may be connected to the heating-water circulation pipe 121 and the heating-water supply pipe 123, and a three-way valve 126 for transition to a heating mode or a hot-water mode may be connected to a connection point between the heating-water supply pipe 123 and the connecting pipe 125. The heat exchanger 110 may be connected to the connecting pipe 125, and in the hot-water mode, the heating water and the direct water may exchange heat with each other. In this way, the heat exchanger 110 may indirectly receive heat that the burner provides to the heating heat exchanger 120.

A hot-water supply method according to another aspect of the second embodiment of the present disclosure will be described. The hot-water supply method, which will be described below, uses the above-described hot-water supply apparatus 100. Therefore, repetitive descriptions identical to ones given above will be omitted.

The hot-water supply method according to the second embodiment of the present disclosure relates to a hot-water supply method applied to the hot-water supply apparatus that includes the burner that is connected to the at least one processor 105 and that directly or indirectly provides heat required for generation of hot water to the heat exchanger 110 that receives direct water through the direct-water inflow pipe 130, generates the hot water by heating the received direct water by heat exchange, and releases the generated hot water through the hot-water supply pipe 140, and the mixing valve 160 that is connected to the at least one processor 105 and disposed in-line with the mixing pipe 150 connecting the direct-water inflow pipe 130 and the hot-water supply pipe 140 and that mixes the direct water with the hot water that is released from the heat exchanger 110 and that flows through the hot-water supply pipe 140.

The hot water upstream of the connection point between the hot-water supply pipe 140 and the mixing pipe 150 is referred to as the first hot water, and the hot water downstream of the connection point is referred to as the second hot water.

The hot-water supply method according to the present disclosure includes a step of determining whether the mixing valve 160 is faulty and a step of controlling the burner such that the temperature of the second hot water supplied to the outside through the hot-water supply pipe 140 reaches the target temperature, when it is determined that the mixing valve 160 is faulty.

The above-described hot-water supply apparatus 100 and method according to the second embodiment of the present disclosure may be applied to the above-described first embodiment of the present disclosure.

The hot-water supply apparatus and method according to the present disclosure may efficiently control the electronically controlled mixing valve, thereby minimizing a hot-water temperature deviation.

In addition, the hot-water supply apparatus and method according to the present disclosure may prevent unnecessary combustion stop and overheating error when the electronically controlled mixing valve is faulty, thereby effectively supplying hot water.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A hot-water supply apparatus comprising:
at least one processor;
a burner connected to the at least one processor and configured to directly or indirectly provide heat required for generation of hot water to a heat exchanger configured to receive direct water through a direct-water inflow pipe, generate the hot water by heating the received direct water by heat exchange, and release the generated hot water through a hot-water supply pipe;
a mixing valve connected to the at least one processor and disposed in-line with a mixing pipe configured to connect the direct-water inflow pipe and the hot-water supply pipe, the mixing valve being configured to mix the direct water with the hot water flowing through the hot-water supply pipe after released from the heat exchanger; and
a memory connected to the at least one processor and configured to store instructions,
wherein hot water upstream of a connection point between the hot-water supply pipe and the mixing pipe is referred to as first hot water, and hot water downstream of the connection point is referred to as second hot water, and
wherein the instructions, when executed, cause the processor to:
obtain a reference temperature based on temperature of the direct water and required temperature of the second hot water, the reference temperature being temperature of the first hot water that allows the mixing valve to maintain a preset opening ratio;
control the burner such that the temperature of the first hot water released from the heat exchanger reaches the obtained reference temperature,
adjust the reference temperature to a second adjustment temperature based on the temperature of the direct water, the required temperature of the second hot water, and a predetermined opening ratio lower than the preset opening ratio, when an operating ratio of the burner required to reach the obtained reference temperature is above a preset second reference range;
adjust the reference temperature to the second adjustment temperature based on the temperature of the direct water, the required temperature of the second hot water, and a predetermined opening ratio higher than the preset opening ratio, when the operating ratio of the burner required to reach the obtained reference temperature is below the preset second reference range; and
control the burner such that the temperature of the first hot water reaches the adjusted second adjustment temperature.

2. The hot-water supply apparatus of claim 1, further comprising:
a first hot-water temperature sensor provided at the hot-water supply pipe and configured to measure the temperature of the first hot water,
wherein the instructions, when executed, cause the processor to:
obtain a reference opening ratio of the mixing valve based on the temperature of the direct water and the temperature of the first hot water measured by the first hot-water temperature sensor, wherein the reference opening ratio of the mixing valve allows temperature of the second hot water to reach the required temperature; and
control the mixing valve depending on the reference opening ratio.

3. The hot-water supply apparatus of claim 1, wherein an opening ratio of the mixing valve for acquisition of the reference temperature is an intermediate value between a maximum opening ratio and a minimum opening ratio of the mixing valve.

4. The hot-water supply apparatus of claim 1, wherein the instructions, when executed, cause the processor to:
adjust the reference temperature to a first adjustment temperature such that the obtained reference temperature is within a first reference range, when the obtained reference temperature is outside the preset first reference range; and
control the burner such that the temperature of the first hot water released from the heat exchanger reaches the adjusted first adjustment temperature.

5. The hot-water supply apparatus of claim 4, wherein the instructions, when executed, cause the processor to:
set the first adjustment temperature to a minimum value of the first reference range, when the obtained reference temperature is below the first reference range; and
set the first adjustment temperature to a maximum value of the first reference range, when the obtained reference temperature is above the first reference range.

6. The hot-water supply apparatus of claim 1, wherein the instructions, when executed, cause the processor to:
adjust the reference temperature to the second adjustment temperature based on the temperature of the direct water, the required temperature, and a minimum opening ratio of the mixing valve, when the operating ratio of the burner required to reach the obtained reference temperature is above the preset second reference range; and
adjust the reference temperature to the second adjustment temperature based on the temperature of the direct water, the required temperature, and a maximum opening ratio of the mixing valve, when the operating ratio of the burner required to reach the obtained reference temperature is below the preset second reference range.

7. The hot-water supply apparatus of claim 1, wherein the instructions, when executed, cause the processor to:
adjust the second adjustment temperature to a third adjustment temperature within a third reference range, when the adjusted second adjustment temperature is outside the preset third reference range; and control the burner such that the temperature of the first hot water reaches the adjusted third adjustment temperature.

8. The hot-water supply apparatus of claim 1, further comprising:
a heating heat exchanger configured to receive heat from the burner and heat heating water for heating by heat exchange,
wherein the heat exchanger receives the heated heating water from the heating heat exchanger and generates the hot water by heating the direct water by heat exchange with the heating water.

9. A hot-water supply apparatus comprising:
at least one processor;
a burner connected to the at least one processor and configured to directly or indirectly provide heat required for generation of hot water to a heat exchanger configured to receive direct water through a direct-water inflow pipe, generate the hot water by heating the received direct water by heat exchange, and release the generated hot water through a hot-water supply pipe;
a mixing valve connected to the at least one processor and disposed in-line with a mixing pipe configured to connect the direct-water inflow pipe and the hot-water supply pipe, the mixing valve being configured to mix the direct water with the hot water flowing through the hot-water supply pipe after released from the heat exchanger; and
a memory connected to the at least one processor and configured to store instructions,
wherein hot water upstream of a connection point between the hot-water supply pipe and the mixing pipe is referred to as first hot water, and hot water downstream of the connection point is referred to as second hot water, and
wherein the instructions, when executed, cause the processor to:
determine whether the mixing valve is faulty;
control the burner such that temperature of the second hot water supplied to the outside through the hot-water supply pipe reaches a target temperature, when the mixing valve is faulty,
obtain an opening ratio of the mixing valve in a faulty state, when the mixing valve is faulty;
obtain a reference temperature based on the obtained opening ratio of the mixing valve, temperature of the direct water, and required temperature of the second hot water, the reference temperature being temperature of the first hot water;
adjust the reference temperature to a fourth adjustment temperature such that the reference temperature is within a fourth reference range, when the obtained reference temperature is outside the preset fourth reference range; and
set the fourth adjustment temperature to a maximum value of the fourth reference range, when the obtained reference temperature is above the fourth reference range.

10. The hot-water supply apparatus of claim 9, wherein the instructions, when executed, cause the processor to:
obtain the target temperature based on the required temperature of the second hot water, when the obtained reference temperature is within a preset fourth reference range; and
control the burner such that the temperature of the second hot water reaches the obtained target temperature.

11. The hot-water supply apparatus of claim 9, wherein the instructions, when executed, cause the processor to:
obtain the target temperature based on the temperature of the direct water, the obtained opening ratio of the mixing valve, and the fourth adjustment temperature; and
control the burner such that the temperature of the second hot water reaches the obtained target temperature.

12. The hot-water supply apparatus of claim 11, wherein the instructions, when executed, cause the processor to:
obtain the opening ratio of the mixing valve in the faulty state, based on the temperature of the direct water and the temperatures of the first hot water and the second hot water in the faulty state.

13. The hot-water supply apparatus of claim 9, wherein the instructions, when executed, cause the processor to:
predict a degree to which the temperature of the second hot water is raised by residual heat depending on an operating ratio of the burner, when the mixing valve is faulty;
set the target temperature in consideration of the predicted degree to which the temperature of the second hot water is raised; and
control the burner such that the temperature of the second hot water reaches the set target temperature.

14. The hot-water supply apparatus of claim 9, further comprising:
a heating heat exchanger configured to receive heat from the burner and heat heating water for heating by heat exchange,
wherein the heat exchanger receives the heated heating water from the heating heat exchanger and generates the hot water by heating the direct water by heat exchange with the heating water.

15. A hot-water supply method applied to a hot-water supply apparatus, wherein the hot-water supply apparatus includes:
a burner configured to directly or indirectly provide heat required for generation of hot water to a heat exchanger configured to receive direct water through a direct-water inflow pipe, generate the hot water by heating the received direct water by heat exchange, and release the generated hot water through a hot-water supply pipe; and
a mixing valve disposed in-line with a mixing pipe configured to connect the direct-water inflow pipe and the hot-water supply pipe, the mixing valve being configured to mix the direct water with the hot water flowing through the hot-water supply pipe after released from the heat exchanger,
wherein hot water upstream of a connection point between the hot-water supply pipe and the mixing pipe is referred to as first hot water, and hot water downstream of the connection point is referred to as second hot water, and
wherein the hot-water supply method comprises:
determining whether the mixing valve is faulty;
controlling the burner such that temperature of the second hot water supplied to the outside through the hot-water supply pipe reaches a target temperature, when the mixing valve is faulty,
obtaining an opening ratio of the mixing valve in a faulty state, when the mixing valve is faulty;
obtaining a reference temperature based on the obtained opening ratio of the mixing valve, temperature of the direct water, and required temperature of the second hot water, the reference temperature being temperature of the first hot water;

adjusting the reference temperature to a fourth adjustment temperature such that the reference temperature is within a fourth reference range, when the obtained reference temperature is outside the preset fourth reference range; and obtaining the opening ratio of the mixing valve in the faulty state, based on the temperature of the direct water and the temperatures of the first hot water and the second hot water in the faulty state.

* * * * *